(12) United States Patent
Yano et al.

(10) Patent No.: US 8,245,940 B2
(45) Date of Patent: Aug. 21, 2012

(54) CARD-LIKE MAGNETIC RECORDING MEDIUM, METHOD FOR MANUFACTURING THE RECORDING MEDIUM, LAMINATED BODY FOR TRANSFER AND METHOD FOR MANUFACTURING THE LAMINATED BODY

(75) Inventors: Daisuke Yano, Kitaadachi-gun (JP); Yoshikazu Yamazaki, Kitaadachi-gun (JP)

(73) Assignee: DIC Corporation, Tokyo (JP)

( * ) Notice: Subject to any disclaimer, the term of this patent is extended or adjusted under 35 U.S.C. 154(b) by 157 days.

(21) Appl. No.: 12/594,122

(22) PCT Filed: Mar. 25, 2008

(86) PCT No.: PCT/JP2008/055551
§ 371 (c)(1),
(2), (4) Date: Sep. 30, 2009

(87) PCT Pub. No.: WO2008/123236
PCT Pub. Date: Oct. 16, 2008

(65) Prior Publication Data
US 2010/0116891 A1    May 13, 2010

(30) Foreign Application Priority Data

Mar. 30, 2007  (JP) .................................. 2007-092957

(51) Int. Cl.
*G06K 5/00*  (2006.01)
(52) U.S. Cl. ........................ 235/488; 235/492
(58) Field of Classification Search .................. 235/488, 235/487, 492
See application file for complete search history.

(56) References Cited

U.S. PATENT DOCUMENTS

| | | | |
|---|---|---|---|
| 4,728,177 A * | 3/1988 | Green | 359/270 |
| 7,771,816 B2 * | 8/2010 | Leenders et al. | 428/204 |
| 2008/0232221 A1 * | 9/2008 | Holmes et al. | 369/94 |

FOREIGN PATENT DOCUMENTS

| | | |
|---|---|---|
| EP | 1752971 A1 | 2/2007 |
| JP | 10-091946 A | 4/1989 |
| JP | 9-306240 A | 11/1997 |
| JP | 2791728 B2 | 8/1998 |
| JP | 2000-272275 A | 10/2000 |
| JP | 2001-202616 A | 7/2001 |

(Continued)

OTHER PUBLICATIONS

International Search Report for PCT/JP2008/055551, mailing date of Jun. 10, 2008.
Japanese Office Action for corresponding Japanese Patent Application No. 2008-535823, mailing date of Oct. 16, 2008 and an English translation thereof.

(Continued)

*Primary Examiner* — Daniel St. Cyr
(74) *Attorney, Agent, or Firm* — Westerman, Hattori, Daniels & Adrian, LLP

(57) ABSTRACT

To provide a card-like magnetic recording medium and a transferable laminate which can make a hologram distinctly recognizable and can prevent the occurrence of an ESD fault. In the card-like magnetic recording medium, on the magnetic recording layer 12 formed on the base material for a card 20, the transparent non-conductive deposited layer 14 and the transparent optical diffraction layer 15 are laminated in this order; between the magnetic recording layer 12 and the transparent non-conductive deposited layer 14, a reflective ink layer 13 which includes, at least, binder resin and metal flake, is formed; and a mass ratio of this binder resin/metal flake is set from 3 to 10.

6 Claims, 5 Drawing Sheets

FOREIGN PATENT DOCUMENTS

| | | |
|---|---|---|
| JP | 2003-168208 A | 6/2003 |
| JP | 2003-251754 A | 9/2003 |
| JP | 2003-326824 A | 11/2003 |
| JP | 2007-164768 A | 6/2007 |
| JP | 2007-273002 A | 10/2007 |

OTHER PUBLICATIONS

European Search Report dated Feb. 4, 2010, issued in corresponding European Patent Application No. 08722761.7.

* cited by examiner

CARD-LIKE MAGNETIC RECORDING MEDIUM, METHOD FOR MANUFACTURING THE RECORDING MEDIUM, LAMINATED BODY FOR TRANSFER AND METHOD FOR MANUFACTURING THE LAMINATED BODY

TECHNICAL FIELD

The present invention relates to card-like magnetic recording medium, a method for manufacturing the card-like recording medium, transferable laminate, and method for manufacturing for the transferable laminate; and, especially, the present invention relates to a card-like magnetic recording medium, a method thereof, a transferable laminate and a method thereof, which has the hologram effect of changing the appearance according to a direction of sight.

BACKGROUND OF THE INVENTION

In order to improve design quality and security feature of a magnetic card, providing a transparent optical diffraction layer for hologram image formation on the card is proposed and performed.

Formally, as the magnetic card with a hologram of high design quality in which a hologram image is especially formed on a magnetic recording layer, the card shown in FIG. 4 is proposed.

As for the magnetic card illustrated in this FIG. 4, an adhesive layer 51, a magnetic recording layer 52, an anchor layer 53, a metal deposited layer 54, a transparent optical diffraction layer 55, and a protective layer 56 are formed on a base material of a card 20.

Subsequently, metal, such as aluminum, is used for this metal deposited layer 54, and a hologram is formed by a light reflection at a boundary surface of a metal deposition layer and transparent optical diffraction layer; simultaneously, it plays a role which conceals hue of a magnetic recording layer, effectively.

On the other hand, as a method to improve design quality by enabling to recognize a background such as the magnetic recording layer visually rather than to conceal, a technology about a magnetic card with a transparent hologram is known (as refer to patent document 1).

In this patent document 1, instead of a metal deposited layer, a transparent layer which has a different refractive index from a transparent optical diffraction layer, adjoining a transparent optical diffraction layer was used to form transparent hologram, and a print layer formed on the magnetic recording layer is to be seen through the transparent hologram.

Then, in order to conceal hue of the magnetic recording layer and to improve design quality further, it is described that a concealing layer containing aluminum powder, etc., which has high ability for concealing the hue of the background layer, can be used between the magnetic recording layer and the print layer.

Also, as a technology about a magnetic card with a transparent hologram, the technology of making a print layer with higher design quality is known, in which high-luminosity reflecting ink layer is formed on a part of a region of one surface of the transparent hologram which has a transparent optical diffraction layer, (for example, as refer to patent document 2).

Further on the other hand, about a technology of forming an ink layer having the metal tone surface in a laminate, a lamination sheet for molding which has an ink layer containing metal flake and binder resin, with the content of metal flake of 3-60 mass % in the layer, and with coating thickness of 0.05-2 µm, being coated by micro gravure is reported (for example, as refer to patent document 3).

However, in the patent document 1, the concealing layer which conceals the hue of the magnetic recording layer is provided by being only paid attention to hiding hue of the magnetic recording layer, and any particular consideration is not taken about the reflectivity.

Usually, aluminum powder used for a concealing layer is the aluminum powder ground and stretched by a ball mill etc., and the reflectivity is low.

Therefore, since the concealing layer provided by using such aluminum powder had low reflectance and reflected light from the concealing layer was not able to be gained sufficiently, and there was a problem that a design of a hologram could not be visible finely and clearly.

Also, in the patent documents 2, although a high-luminosity reflecting ink layer with high reflectivity was formed; since the high-luminosity reflecting ink layer was formed only a part of a region of the surface of the transparent reflecting layer adjoined the transparent optical diffraction layer, reflected light from a region of a high-luminosity reflecting ink layer being not formed was not enough, and there was a problem that a hologram could not be visible finely and clearly.

The patent documents 1 and the patent documents 2 suggests to substitute a formation of high gloss coating having metal powder for the formerly-known metal deposited layer 54 as shown in FIG. 4.

However, in a magnetic card which was a configuration as shown in FIG. 4, since the highly conductive metal deposited layer 54 was used, there was a problem that an ESD (Electro Static Discharge) failure occurred.

Here, the ESD failure is: a phenomenon, which causes malfunction and destruction of the card reader when a magnetic card which has the metal deposited layer 54 on a magnetic recording layer 52 was used. In the ESD failure, electric charge accumulated in human bodies caused from static electricity, or electric charge accumulated in the magnetic card and/or the magnetic stripe caused from charging by contacting or rubbing of magnetic card and/or the magnetic stripe itself with the other objects, flows into the head of the card reader through the metal deposited layer 54 at the time of reading information recorded on this magnetic recording layer 52, and caused to malfunction and destruction of the card reader.

The ESD failure may occur not only in a magnetic card which has a metal deposited layer but also in a magnetic card which has a reflective layer or a concealing layer containing metal powder.

However, in the patent documents 1 and the patent documents 2, since the concealing layer or the reflecting ink layer was used only for the purpose of improving the external appearance of the magnetic card, and any consideration about the ESD failure was not paid; thus, there was a problem that a possibility of occurring the ESD failure was very high.

In a laminated sheet of the patent documents 3, an ink layer which has the luminous design of a metal tone including metal flake and binder resin is formed.

Then, formation of an ink layer with high reflectivity by micro-gravure coating is performed.

However, when these ink layer is applied as a reflective ink layer of card-like magnetic recording medium having a hologram, an investigation of composition and manufacturing method of the ink layer in detail is required in order to maintain high reflectivity of ink layer surface, and suppress the occurrence of the above-mentioned ESD failure, simultaneously.

However, such an investigation aiming at control of an ESD failure is not carried out so far.

Patent document 1: JP-A-2000-272275
Patent document 2: JP-A-2003-326824
Patent document 3: JP-A-2003-251754

DISCLOSURE OF THE INVENTION

Object of the Invention

In light of the above-mentioned circumstances, the present invention has the purpose in providing a card-like magnetic recording medium which can be clearly recognized a hologram visually and can prevent the occurrence of an ESD failure, its method for manufacturing, and a transferable laminate.

Summary of the Invention

The present invention provides a card-like magnetic recording medium having a transparent non-conductive deposited layer and the transparent optical diffraction layer, from a side close to the magnetic recording layer in this order, on the magnetic recording layer formed on a base material of a card, wherein it has a reflective ink layer which contains metal flake and binder resin between the magnetic recording layer and the transparent non-conductive deposited layer, and a value of a mass ratio of the binder resin/metal flake of the reflective ink layer is in the range of 3.0 to 10.0, that is, a mass ratio of binder resin to metal flake is from 3.0:1 to 10.0:1.

Also, the present invention provides a method for manufacturing of a card-like magnetic recording medium, wherein comprising the steps of: from a side close to a magnetic recording layer, forming a reflective ink layer, a transparent non-conductive deposited layer, and a transparent optical diffraction layer, in this order on the magnetic recording layer formed on a base material; and formation of the reflective ink layer is carried out by coating by micro-gravure coating of reflective ink containing metal flake and binder resin.

Further, the present invention provides a transferable laminate which has a transparent optical diffraction layer, a transparent non-conductive deposited layer, a magnetic recording layer, and an adhesive layer as required from a side close to the temporary support for transfer, wherein it has reflective ink layer which contains metal flake and binder resin between the transparent non-conductive deposited layer and the magnetic recording layer, and a value of a mass ratio of the binder resin/metal flake of this reflective ink layer is in the range of 3.0 to 10.0, that is, a mass ratio of binder resin to metal flake is from 3.0:1 to 10.0:1.

Furthermore, the present invention provides a method for manufacturing of a transferable laminate, wherein laminating, from a side close to the temporary support for transfer, a transparent optical diffraction layer, a transparent non-conductive deposited layer, a reflective ink layer, a magnetic recording layer, and an adhesive layer as required in this order, and the reflective ink layer being formed by coating with micro-gravure coating of reflective ink containing metal flake and binder resin.

Moreover, the present invention provide a method for manufacturing of a card-like magnetic recording medium, wherein comprising the steps of manufacturing the transferable laminate by the above-mentioned method for transferable laminate, and the steps of laminating on the base material, via the adhesive layer as required, the magnetic recording layer, the reflective ink layer, the transparent non-conductive deposited layer, and the transparent optical diffraction layer, in this order from a side close to the base material by using the transferable laminate.

Effect of the Invention

A card-like magnetic recording medium of the present invention forms a reflective ink layer between a magnetic recording layer and a transparent non-conductive deposited layer, and a value of a mass ratio of the binder resin/metal flake in the reflective ink layer is from 3.0 to 10.0, that is, the mass ratio of binder resin to metal flake is from 3.0:1 to 10.0:1.

Thereby, for a reflective ink layer which uses metal flake, a magnetic recording layer is concealed favorably with making it possible to form a clear hologram and also with preventing to occurrence of an ESD failure.

In a method for manufacturing of a card-like magnetic recording medium of the present invention, since a reflective ink layer formed between a magnetic recording layer and a transparent non-conductive deposited layer is applied by micro-gravure coating, it is easy to orientate metal flake on a gravure cylinder of a high rotational, and a higher reflectance of the reflective ink layer surface can be obtained in content of the same metal flake.

Since a transferable laminate of the present invention has a reflective ink layer which contains metal flake and binder resin between a transparent non-conductive deposited layer and a magnetic recording layer, and a value of a mass ratio of the binder resin/metal flake of this reflective ink layer is from 3.0 to 10.0, that is, a mass ratio of binder resin to metal flake is from 3.0:1 to 10.0:1, when a card-like magnetic recording medium with a hologram is formed by using this transferable laminate, a clear hologram can be formed with a magnetic recording layer hidden satisfactory, and an occurrence of an ESD fault can be prevented.

Further, since a method for manufacturing of a transferable laminate of the present invention uses a reflective ink layer containing metal flake and binder resin, being formed between a transparent non-conductive deposited layer and a magnetic recording layer, and being formed by micro gravure coating, reflectance of the surface of a reflective ink layer can be made into high value.

Furthermore, by using a method for manufacturing of a card-like magnetic recording medium wherein comprising steps of: laminating on base material of a card, via an adhesive layer as required, a magnetic recording layer, a reflective ink layer, a non-conductive transparent deposited layer, and a transparent optical diffraction layer in this order from a side close to a base material of a card, even if it contains metal flake of the same quantity in a reflective ink layer, a reflectance of a reflective ink layer is higher, and a card-like magnetic recording medium with clearly recognizable hologram can be manufactured.

DETAILED DESCRIPTION

Hereafter, embodiments of the present invention are described with reference to drawings.

Figure 1:
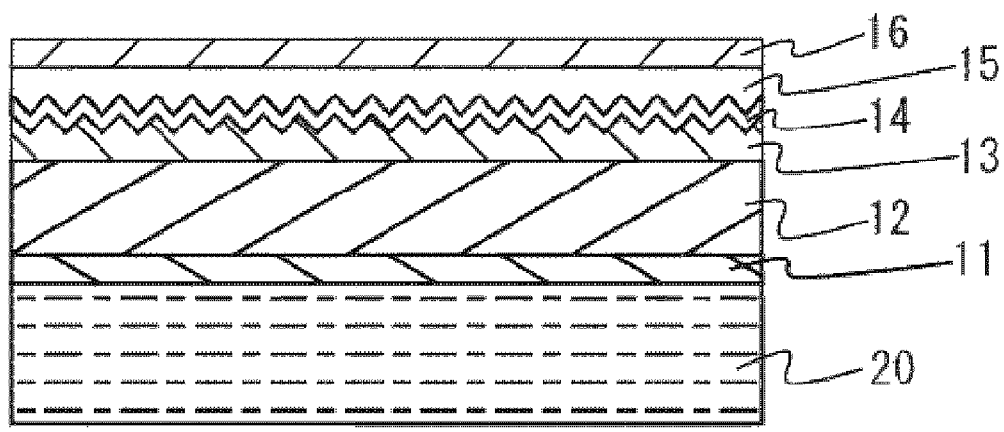
FIG. 1 is a sectional view showing an example of a composition of a card-like magnetic recording medium of the present invention.

FIG. 1 is a sectional view illustrating an example of a configuration of a card-like magnetic recording medium by an embodiment of the present invention.

This card-like magnetic recording medium is formed with an adhesive layer 11, a magnetic recording layer 12, a reflective ink layer 13, a transparent non-conductive deposited layer 14, a transparent optical diffraction layer 15, and a protective layer 16, which are laminated on a base material of a card 20, respectively.

The adhesive layer 11 is provided on one surface of the magnetic recording layer 12 as required.

As material of the adhesive layer 11, publicly known thermal adhesives, which melt or become soft and exhibit an adhesion effect when heated, can be applied; specifically, vinyl chloride-vinyl acetate copolymer, (meth)acrylic series resin, such as acrylic series and an methacrylic series, polyester series resin, polyamide series resin, vinyl series resin, ionomer resin, acid-modified polyolefin series resin, an ethylene-(meth)acrylic acid copolymer, an ethylene-(meth)acrylic ester copolymer, maleic resin, butyral series resin, alkyd resin, polyethylene oxide resin, phenolic resin, urea resin, melamine resin, melamine alkyd resin, cellulose series resin, polyurethane series resin, polyvinyl ether resin, silicone resin, rubber series resin, etc., can be applied; and one or combination of more than one resin (s) are used according to a base material of a card.

To form the adhesive layer 11 by these resins: a paint for adhesive layers in which resins as raw materials is dissolved or dispersed in a solvent, and additive agents such as pigment are suitably added is applied and dried by publicly known methods, such as roll coating, gravure coating, etc, with the thickness of the layer being in the range of about 0.1 to 30 μm, preferably in the range of 0.4 to 10 μm.

For thickness of the adhesive layer 11: when the thickness is less than 0.1 μm, adhesive strength with the base material of a card 20 is insufficient for this thickness and peels off easily; and when thickness exceeds 30 μm; since an adhesion effect is enough and the effect does not increase anymore, it is waste of cost.

Also, additives, such as a filler, a plasticizer, a colorant, and an antistatic agent, may be added suitably to the adhesive layer 11 further, as required.

As the extender pigment, such as silica and calcium carbonate, is applicable for the filler.

Especially, addition of the extender pigment makes a good stamping performance of adhesive layers.

As an antistatic agent, a nonionic surfactant, an anionic surfactant, a cationic surfactant, etc., and polyamide, an acrylic acid derivative, etc., are applicable.

The magnetic recording layer 12 is a layer which magnetically records various information about usage of the card; for example, as seen in automatic ticket gate of a commuter pass, the judgment is carried out that the magnetic card is genuine or not, or that the usage is rightful or not by reading the recorded data with magnetic head and by using a part of the read data. Then, the magnetic recording layer is formed with particles of a metal or a metal oxide having magnetism dispersed in binder resin.

As particles of a metal or a metal oxide used for the magnetic recording layer 12, formerly known publicly magnetic particulates, such as, $\gamma$-$Fe_2O_3$, $Fe_3O_4$, $CrO_2$, Fe, Fe—Cr, Fe—Co, Co—Cr, Co—Ni, MnAl, Ba ferrite, Sr ferrite are used.

In order to form the magnetic recording layer 12, which comprises these magnetic particulates dispersed into the binder resin, coating material for producing magnetic recording layer, in which the magnetic particle, binder resin, etc., are dispersed or dissolved in the solvent are applied to the base material of a card 20 and dried with a publicly known coating method; and by aging suitably with a temperature of 30° C. to 70° C., as required, or by irradiating and hardening with ionizing radiation (ultraviolet radiation, electron rays, etc.).

As a coating method, for example, a roll coating, a reverse roll coating, a transfer roll coating, a gravure coating, a microgravure reverse coating, a kiss coating, a comma coating, a rod coating, a blade coating, a bar coating, a wire bar coating, a knife coating, a squeeze coating, an air doctor coating, an air knife coating, a die coating, a lip coating, a curtain coating, a flow coating, etc., are applicable.

When the magnetic recording layer 12 is formed with these coating methods, the thickness is preferably in the range of 1 to 100 μm, and more preferably in the range of 5 to 20 μm.

Further, as a material of binder resin in which magnetic particulates, such as $\gamma$-$Fe_2O_3$, are dispersed, butyral resin, vinyl chloride/vinyl acetate copolymer resin, urethane resin, polyester resin, cellulose series resin, acrylic resin, styrene/maleic acid copolymer resin, etc., are used; and rubber series resin such as nitrile rubber, or urethane elastomer, etc., can be added as required.

Further, a surface-active agent, a silane coupling agent, a plasticizer, wax, silicone oil, carbon, and the other additives can be used as required.

The reflective ink layer 13 is provided to all the area of the surface which is one surface of the transparent non-conductive deposited layer 14, and which is the opposite side of the surface contacting to the transparent optical diffraction layer.

By forming a reflective ink layer, a reproduced image of a hologram image with metallic luster (metallic reflection gloss) can be recognized clearly.

Although there was a printing ink which gave metallic luster formerly, the ink was such a metallic tone printing ink as silver or gold, which used metal pigments of an aluminium paste, aluminium powder, etc.

There are a leafing type and a non-leafing type in the aluminium paste; however, even if either of them was used, it was no match for a metallic luster of a metallic thin film formed by a vacuum film method.

In the present invention, because of using reflective ink in which metal flake, such as aluminium, is dispersed in resin as the reflective ink, the reflective layer is able to manufacture with a common coater; and the metallic luster equivalent to a metallic thin film formed by using a vacuum film method, is acquired; and it can be used suitably as the reflecting layer of a hologram image having high-luminosity.

As the metal flake used for the reflective ink, each of the flakes shows electrical conductivity as well as the metallic thin film formed by using the vacuum film method.

However, in the reflective ink layer, since the metal flakes disperse in binder resin, these flakes can make a distance each other, and electric conductivity can be set lower as the whole reflective ink layer.

The metal flake used for the present invention is made by grinding a thin film of metal obtained by vacuum evaporation, sputtering, flatting, etc., to fine pieces.

As metal for producing the metal flake, aluminium, gold, silver, copper, brass, titanium, chromium, nickel, nickel chromium, stainless steel, etc., can be used.

As a method to use metal as a thin film, in a case of the melting point is low, such as aluminium, formation of a thin film by evaporation can be used; and in a case of having the malleability, such as aluminium, gold, silver, copper, etc., formation of foil by flatting can be used.

On the other hand, in the case of metal, which has neither malleability nor low melting point, formation of a thin film by sputtering, etc., can be used.

Metal flake is obtained by grinding these thin films. In these metal flakes, those obtained from thin film formed by using metal evaporation is preferred.

Thickness of a metallic thin film is preferably in a range of 0.01 to 0.1 μm, and is further preferably in the range of 0.02 to 0.08 μm.

The size of metal flake dispersed in ink in a plane direction is preferably in the range of 5 to 25 μm, and is further preferably in the range of 10 to 15 μm.

When the size is less than 5 μm, luminosity of the coating becomes insufficient; and in case of exceeding 25 μm, since the metal flake is difficult to orientate, the luminosity declines.

As binder resin used for a reflective ink layer, the binder resin which is used in conventional gravure ink, flexo ink, screen ink, or a binder resin usually used for coating material is available, and it is preferred to use a binder resin containing at least one substituent of the selected from the group consisting a carboxyl group, a phosphoric acid group, a sulfonic acid group, a nitric acid group, an amino groups, and metal salt of those.

Specifically, for example, in the case of polymerization system resin, such a copolymerized resin as, acrylic resin, vinyl chloride resin, vinylidene chloride resin, vinyl chloride-vinyl acetate resin, ethylene-vinyl acetate resin, polyolefin resin, chlorinated olefine resin, and ethylene-acrylic resin, with which copolymerizing (meth) acrylic acid, phthalic acid, fumaric acid and/or its salt, (meth) acryloyloxy ethylsulfonyl sodium salt, dimethylaminopropyl and (meth) acrylic acid ester etc., is used preferably; or in the case of condensed system resin, such as polyurethane resin, polyamide resin, urea resin, epoxy resin, polyester resin, in which applied for a part of polyol ingredient and polycarboxylic acid component, 2,2-dimethylolpropionic acid, 5-sulfonic acid phthalic acid, and diethanol aminoethyl diisopropylphosphoric ester, etc., is preferably used; such resin as, petroleum series resin, cellulosic resin, etc., which denaturalized with chloro acetic acid, bromoacetic acid, concentrated sulfuric acid, and concentrated nitric acid, etc., is used preferably. These thermoplastic resins, as mentioned above are preferably used.

Also, other than this binder resin, in the range which does not impair the aim of the present invention, such resin as generally used for ink or a coating material can be used together, acrylic resin, vinyl chloride resin, vinylidene chloride resin, vinyl chloride-vinyl acetate resin, ethylene-vinyl acetate resin, polyolefin resin, chlorinated olefine resin, an ethylene-acrylate resin, polyurethane resin, polyamide resin, urea resin, epoxy resin, and polyester resin.

In order for a reflective ink layer formed in this way to attain low electrical conductivity, a value of a mass ratio of the binder resin/metal flake of reflective ink is 3.0 or more, and in case a reflectance of a reflective ink layer is considered, it is from 3.0 to 10.0.

As for this mass ratio, from 3.0 to 7.0 is preferred, and from 3.0 to 5.0 is more preferred.

When a value of this mass ratio is smaller than 3.0, spacing of metal flake will not become enough, the electrical conductivity of a reflective ink layer cannot be held low, and thus a possibility of occurrence of ESD fault increases.

On the other hand, when a reflectance of a reflective ink layer is considered, a value of a mass ratio of binder resin/metal flake is 10.0 or less, 7.0 or less is preferable, and 5.0 or less is further more preferred.

When a value of a mass ratio of binder resin/metal flake is larger than 10.0, because of the reflectance being decline, acquiring a good hologram image becomes difficult.

Therefore, in order to realize a good reflectance and low electrical conductivity, a value of a mass ratio of the binder resin/metal flake of a reflective ink layer is in the range of 3.0 to 10.0, preferably in the range of 3.0 to 7.0, and more preferably in the range of 3.0 to 5.0.

Further, generally, in order to disperse raw material of ink with stability, pigments and other additives are made into fine particles in the order of submicron, by milling or dispersing using a roll mill, a ball mill, a bead mill, a sand mill, etc.

However, metal flake, which is mixed in the reflective ink used for a reflective ink layer of the present invention for developing metallic luster is preferred as size of 5 to 25 μm. Thus, if the above-mentioned milling is carried out, metal flake becomes too fine particle, and metallic luster declines extremely.

Therefore, it is preferred not to carry out milling in production of reflective ink used for a reflective ink layer of the present invention, but just only to mix the above-mentioned raw material for reflective ink.

A reflective ink layer can be obtained by applying and drying the reflective ink consisting of metal flake, binder resin, a solvent, and other additives, etc.

As a coating method in this case, coating methods of publicly known and common use, such as gravure coating, reverse coating, die coating, and micro-gravure coating, and a printing method of publicly known and common use, such as gravure, offset printing, screen-stencil, can be used.

The micro-gravure coating method is especially the most preferred because of the ability to obtain a reflective ink layer with a high reflectance.

Here, the micro-gravure coating method is a method which carries out coating by rotating a gravure cylinder with a comparatively small diameter about 100 mm or less, to an opposite direction of the moving direction for the coating base material with the peripheral speed of about 105 to 115% of the speed of coating base material.

A micro gravure coating method by Yasui Seiki Co., Ltd. is a representative example.

In the micro-gravure coating, a gravure cylinder rotates at high speed as compared with a coating roller of other general roll coating methods, such as gravure coatings and reverse coating.

Therefore, it is expected that centrifugal force given to reflective ink on a gravure cylinder becomes large, the orientating tendency of metal flake in reflective ink becomes high as a result, and a reflectance of a reflective ink layer becomes high.

Since transparent non-conductive deposited layer 14 is, formed on one surface of the transparent optical diffraction layer 15, on which relief structure of a hologram is provided, a reproduced image of a hologram can be recognized distinctly by visual inspection.

As for the present invention forming a hologram on the magnetic recording layer, a transparent non-conductive deposited layer is formed with adjoining to the transparent optical diffraction layer 15 to the magnetic recording layer side. For this transparent non-conductive deposited layer 14, a transparent metallic compound is used which has a different refractive index from that of the surface of transparent optical diffraction layer 15 which has contact with the transparent non-conductive deposited layer 14.

Because an optical refractive index of the transparent non-conductive deposited layer 14 is different from that of the transparent optical diffraction layer 15, although it is an almost transparent and colorless hue, with no metallic luster, such a relief as a hologram can be recognized visually.

Moreover, because the transparent non-conductive deposited layer 14 is non-conducting, it does not cause ESD fault.

For the refractive index of the transparent non-conductive deposited layer 14, the lager difference of a refractive index with that of the transparent optical diffraction layer 15 make a larger effect which make hologram recognized more distinctly in visual.

As for a difference of a refractive index, 0.3 or more are preferred, 0.5 or more are even more preferred, and 0.7 or more is the most preferred.

Considering that the refractive index of an optical diffraction layer is generally about 1.5, as a deposition materials for a transparent non-conducting evaporated layer made of such materials, as $ZnS$, $TiO_2$, $Al_2O_3$, $Sb_2O_3$, $SiO$, $TiO$, or $SiO_2$ is applicable.

Because the difference of sufficient refractive index is realizable, using $TiO_2$ and $ZnS$, etc., is desirable.

Though the refractive index is smaller than 1.5, $LiF$, $MgF_2$, $AlF_2$, etc., can be used.

Furthermore, the purpose of the transparent non-conductive deposited layer used in the present invention is, essentially, to make patterns which formed between the deposited layer and the magnetic recording layers recognized thorough this layer, and as for the present invention, the purpose is being fully recognized the reflective ink layer visually, and making it possible to use strong reflected light from the layer. Therefore, only an amount of visible transmitted light for sufficient recognition is required, so a colored deposition material is also applicable and included besides colorless one.

As formation of the above-mentioned transparent metallic compounds, they can be formed to the thickness of about 10 to 2000 nm, preferably to the thickness of about 10 to 1000 nm, by a vacuum film method, such as a vacuum deposition method, a spattering process, and an ion plating method.

When thickness of the transparent non-conductive deposited layer 14 is less than 10 nm, since a rate of transmitting light increase, the reflecting effect decreases. When the thickness is more than 2000 nm, since the reflecting effect does not change, it is unfavorable in cost.

The transparent optical diffraction layer 15 is achromatic or a colored transparent or semi-transparent layer, it may be a monolayer or may be a multilayer-like, and thermoplastic resin thermosetting resin, or photosensitive resin and so on can be used. By using thermoplastic resin or thermosetting resin, imprinting can be reproduced by casting or embossing. By using photosensitive resin, cured part and uncured part according to optical diffraction pattern can be formed.

Specifically, for example, thermoplastic resin, such as polyvinyl chloride, acrylic (polymethylmethacrylate), polystyrene, or polycarbonate, or thermosetting resins, such as unsaturated polyester, melamine, epoxy, polyester (meth)acrylate, urethane (meth)acrylate, epoxy (meth)acrylate, polyether (meth)acrylate, polyol (meth)acrylate, melamine (meth)acrylate, triazine series acrylate; and they can be used independently for each, or can be used mixed within the each group, thermoplastic resin and thermosetting resin, or can be used mixed between thermoplastic resin and thermosetting resin.

Those having radical polymerization-type unsaturated group and having thermoforming ability, and those ionizing radiation cured resin which is added a radical polymerization-type unsaturated monomer can also be used.

A protective layer 16 can be laminated on the transparent optical diffraction layer 15.

The protective layer 16 performs a function which protects the transparent optical diffraction layer 15.

As the material of the protective layer 16, acrylic series resin, polyester series resin, amide series resin, cellulose series resin, vinyl series resin, urethane series resin, olefin series resin, epoxy series resin, etc., can be exemplified, and the thickness is preferable in the range of 0.5 to 5 μm. But the thickness is not limited to the range.

The base material of a card 20 is the same as a base material used for the conventional card; if it has mechanical strength which endure to repeatedly use, chemical resistance, solvent resistance, heat resistance which endure to manufacture, etc., according to a usage, various materials are applicable.

For example, papers, such as fine quality paper, OCR paper, a carbonless paper, and art paper, and a base film, such as vinyl chloride resin and polyethylene terephthalate (abbreviating to PET), is applicable.

For these, although a plate-like object used as a base material of a card is variously called as a film, a sheet, a board, etc., depending on a type of industry, it is considered as the same object in the specification of the present application.

As a material of a base film used as a base material of a card, for example, polyester series resin, such as polyethylene terephthalate, polybutylene terephthalate, polyethylenenaphthalate, polyethylene terephthalate-isophthalate copolymer, terephthalic acid-cyclohexane dimethanol ethylene glycol copolymer, and a coextruded film of polyethylene terephthalate/polyethylenenaphthalate, polyamide series resin, such as nylon 6, Nylon 66, and Nylon 610, polyolefin series resin, such as polyethylene, polypropylene, and polymethylpentene, vinyl series resin, such as polyvinyl chloride, acrylic series resin, such as polyacrylate, poly methacrylate, and polymethylmethacrylate, imide series resin, such as polyimide, polyamidoimide, and polyether imide, engineering resin, such as polyarylate, polysulfone, polyether sulphone, polyphenylene ether, polyphenylene sulfide (PPS), polyaramide, polyether ketone, polyethernitrile, polyether ether ketone, and polyethersulfite, styrene seriesresin, such as polycarbonate, polystyrene, high-impact polystyrene, AS resin, and ABS plastics, cellulose series films, such as cellophane, cellulose triacetate, cellulose diacetate, and cellulose nitrate, etc., are used.

The base film may be copolymerized resin or mixture which uses these resins as a principal component, or a laminate which comprises two or more layers.

Generally, polyester series films, such as polyethylene terephthalate and polyethylenenaphthalate, and vinyl series films, such as polyvinyl chloride, are suitably used for mechanical strength and a cost aspect.

This base film may be, prior to coating, on the coating side, carried out easily-adhesive treatment, which is performed with, such as corona discharge treatment, plasma treatment, ozone treatment, flame treatment, primer coating treatments by applying an adhesion accelerator agent or a quick adhesive agent, and so on, preheating treatment, dust-removing and dustproof treatment, deposition treatment, and alkali treatment, etc.

Also, additives, such as a filler, a plasticizer, a colorant, and an antistatic agent, may be added to the resin film as required.

As a filler, extender pigment such as silica and calcium carbonate, is applicable.

As a colorant, a disperse dye is preferred, and the disperse dyes, such as monoazo, bisazo, anthraquinone, nitro, styryl, methine, aroylen, benzimidazole aminonaphthylamide, naphthoquinoneimide, and a coumarin derivative, can be applied. Normally, a base material, which contains pigment, such as titanium oxide, and colored white, is used.

As an antistatic agent, a nonionic surfactant, an anionic surfactant, a cationic surfactant, etc., polyamide, an acrylic acid derivative, etc., is applicable.

The thickness of the base material of a card 20 may be such that whole stiffness is kept suitably, and, normally, a base material having thickness of 100 to 800 μm is applicable.

When the thickness is over 800 μm, since stiffness is too high, and it is inconvenient for handling, such as carrying and becomes heavy and causes high-cost; and when the thickness is less than 100 μm, wrinkles and creases by repeated use or by external force at the time of carrying makes a occurrence of a reading failure of magnetic data, and thus the endurance is poor.

Although there is no especial limitation about size for base materials, at least, until a process of transferring transfer foil is taken place, it is preferable for efficient manufacturing to use a large size sheet which can carry out imposition for two or more times of card size, or to use an elongated continuous rolling-up object.

Then, the size of base materials after transfer may be decided suitably, so base materials may be cut out as required; and finally need to be pierce or to be cut out to card size.

Although an object of a monolayer may be used as a base material for cards, a plurality of base materials that total thickness is within the above-mentioned range can also be laminated and used.

For example, a transparent base material on which formed a magnetic recording layer, an optical diffraction layer, etc., can be laminated with an opaque base material on which formed a pattern layer separately. This process make it possible to add high design characteristics and to optimize a production process.

Similar technique is also applicable to the back of the magnetic card.

Therefore, magnetic card is formed in many cases with the steps of: laminating two transparent over sheets, with two sheets of opaque base materials which called core sheets in between. At least on one of two over sheets, magnetic recording layers and so on are formed. Then, on two core sheets, a pattern and so on is formed on required.

As the card-like magnetic recording medium of the invention which has the above composition, although each layer can be laminated and manufactured in turn to the whole or a part of the surface on the base material of a card, a part or all of these compositions of lamination can be formed by using a transfer method.

Figure 2:
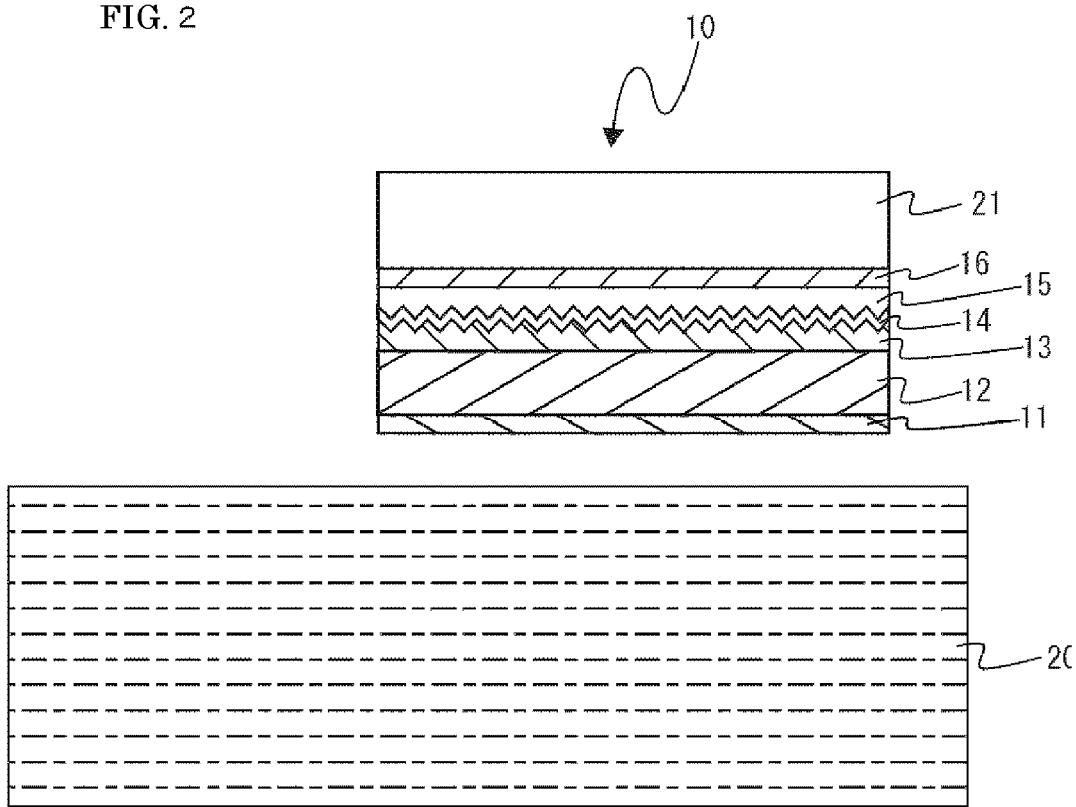
FIG. 2 is a sectional view showing an example of a composition of a transferable laminate of the present invention, and a manufacturing process of a card-like magnetic recording medium by this transferable laminate.

For example, in the case of forming all compositions of lamination of description with a transfer method on a base material of a card, as shown in FIG. 2, the transferable laminate 10 in which laminated sequentially on the temporary support 21 with the protective layer 16, the transparent optical diffraction layer 15, the transparent non-conductive deposited layer 14, the reflective ink layer 13, the magnetic recording layer 12, and the adhesive layer 11, as required, are used.

As shown in FIG. 2, this transferable laminate 10 is piled up on the base material for a card 20 via the adhesive layer 11; and after separating the temporary support, it is laminated under heat and pressure from the protective layer side.

Or, besides not having an adhesive layer, the similar transferable laminate of above-mentioned transferable laminate 10 is pasted together to a base material of a card, after applying an adhesive composition for a lamination to the base material of a card at the time of transfer; then temporary support is peeled off, and it can be laminated by making the adhesives harden and by aging as required.

When a laminate is formed on a part on the base material of a card 20, for example, in stripe shape at a longitudinal direction of a card, etc., this laminate is embedded into the base material for a card 20 by a heating and a pressurizing process, and the surface of the card can be made into a smooth plane with uniform height.

Further, in case plural layered base materials are used as base material of a card, a process of embedding into the above-mentioned base for cards can be carried out simultaneously with a process of laminating and combining these plural bases of a card together.

EXAMPLE

Example 1

A protective layer, a transparent optical diffraction layer, a transparent non-conductive deposited layer, a reflective ink layer, a magnetic recording layer, and a thermal adhesive layer are sequentially formed on temporary support by a procedure described in the following, and a transferable laminate is manufactured.

At first, by using a 23-μm-thick polyethyleneterephthalate film as a temporary support, to one side of the surface, a peelable protective layer is provided by applying and drying the following coating material for peelable protective layers so that the thickness is 1 μm after drying with a reverse coating method.

<A Coating Material for Peelable Protective Layers>

| | |
|---|---|
| Cellulose acetate resin ("L-20 (100% solid content)" produced by DAICEL CHEMICAL INDUSTRIES, LTD.) | 5 parts |
| Acetone | 25 parts |
| Ethyl-acetate | 25 parts |
| Toluene | 20 parts |
| Cyclohexanone | 20 parts |
| Polyisocyanate ("Hardener No. 50 (50% solid content)" by Dainippon Ink & Chemicals, Inc.) | 2 parts |

Yupimer (R) LZ065 (the Mitsubishi Chemical, brand name of ultraviolet-curing-resin) is diluted with a solvent to 25 mass % solid content, and applied to the surface of the peelable protective layer and dried, so that the thickness after drying is set to 2 μm, by using the roll coating method. Then, a transparent optical diffraction layer is formed.

A stamper duplicated by the 2P method from a master hologram separately made by using a laser beam, is stuck on an embossing roll of a duplicator, and press a transparent optical diffraction layer at 150° C. between the embossing roll and a confronting roll, and the relief which is composed of a detailed uneven pattern is formed on a transparent optical diffraction layer.

Immediately after forming, ultraviolet radiation, which wavelength is 200-400 nm, is irradiated with and cured by a high-pressure mercury-vapor lamp.

By a vacuum deposition method, titanium oxide is vapor-deposited in the thickness of 50 nm, to the surface of the transparent optical diffraction layer where the relief is formed. Then a transparent non-conductive deposited layer is formed.

A reflective ink layer is formed by applying and drying the following reflective ink to the surface of this transparent non-conductive deposited layer, in the thickness of 0.5 μm after drying, by micro-gravure coating.

A diameter of used micro gravure is 60 mm, the number of lines is 180, number of rotations corresponds to 33 m/min at peripheral speed with the opposite direction to the movement of a base material, and line velocity is 30 m/min.

<Reflective Ink 1>

| | |
|---|---|
| Metal flake paste ("METASHEEN 71-0010 (10% solid content)" by Toyo Aluminium K.K.) | 10 parts |
| Vinyl chloride-vinyl acetate copolymer resin ("VMCH (100% solid content)" by UCC, co.) | 1.5 parts |
| Polyurethane resin ("NT-810-45 (45% solid content)" by Dainippon Ink & Chemicals, Inc.) | 3.3 parts |
| Methyl ethyl ketone | 25 parts |
| Toluene | 20 parts |
| Cyclohexanone | 20 parts |
| Polyisocyanate ("Hardener No. 50 (50% solid content)" by Dainippon Ink & Chemicals, Inc.) | 0.6 parts |

On this reflective ink layer, the following coating material for magnetic recording layers is applied and dried, with adjusting the thickness of the layer after drying, so that the magnetic output value fulfill the specification of ISO/IEC 7811-6 by a reverse roll coating. Then, a magnetic recording layer is formed.

<A Coating Material for a Magnetic Recording Layer>

| | |
|---|---|
| Barium ferrite magnetic powder ("MC-127" by Toda Kogyo Corp.; coercive force 220 kA/m) | 100 parts |
| Vinyl chloride-vinyl acetate copolymer resin ("SOLBIN A (100% solid content)" by Nissin Chemical Co., Ltd.) | 15 parts |
| Polyurethane resin ("TS-03 (100% solid content)" by Dainippon Ink & Chemicals, Inc.) | 10 parts |
| Methyl ethyl ketone | 50 parts |
| Toluene | 50 parts |
| Cyclohexanone | 25 parts |
| Polyisocyanate ("Hardener No. 50 (50% solid content)" by Dainippon Ink & Chemicals, Inc.) | 10 parts |

Adjustment of a coating material for magnetic recording layers is based on a method as shown in JP-A-09-059541.

On this magnetic recording layer, the following thermal adhesives coating material is coated in the thickness of 3 μm and dried by a reverse roll coating method. Then, the thermal adhesive layer is formed.

<Coating Material for Thermal Adhesive Layers>

| | |
|---|---|
| polyurethane resin ("TS-03 (100% solid content)" by Dainippon Ink & Chemicals, Inc.) | 1 part |
| Vinyl chloride-vinyl acetate copolymer resin ("SOLBIN C5 (100% solid content)" by Nissin Chemical Co., Ltd.) | 4 parts |
| Methyl ethyl ketone | 45 parts |
| Toluene | 50 parts |

After cutting out the transferable laminate manufactured above in predetermined width, the prepared transferable laminate of stripe shape, is adhered with heat and pressure to a polyvinyl chloride over sheet for card construction (by Taihei Chemical Industrial Co. Ltd.), with thermal adhesive layer attached to the over sheet by using a desktop type heat sealer (by TESTER SANGYO CO., LTD).

As conditions at the time of adhesion, temperature of 120° C. and pressure of 4 kg/cm$^2$ are performed in 5 seconds.

Then, by removing temporary support of a transferable laminate, a magnetic stripe part is transferred to an over sheet for card construction. Then, an over sheet for card construction with a magnetic stripe is obtained.

This over sheet for card construction with a magnetic stripe, a center core for card construction, and an over sheet for card construction of an opposite side are piled up; and hot press processing for 140° C., 20 kg/cm$^2$, and 20 minutes are performed by using a platen press machine (by Toyo Seiki Seisaku-sho, Ltd.) Then, a hot press of an over sheet for card construction and a center core for card construction is carried out.

Then, a magnetic card is manufactured by performing a punching process.

Example 2

A magnetic card is prepared, by using the following reflective ink 2 with the same method as in the case of Example 1.

<Reflective Ink 2>

| | |
|---|---|
| Metal flake paste ("METASHEEN 71-0010 (10% solid content)" by Toyo Aluminium K.K.) | 10 parts |
| Vinyl chloride-vinyl acetate copolymer resin ("VMCH (100% solid content)" by UCC, co.) | 2 parts |
| Polyurethane resin ("NT-810-45 (45% solid content)" by Dainippon Ink & Chemicals, Inc.) | 4.4 parts |
| Methyl ethyl ketone | 25 parts |
| Toluene | 20 parts |
| Cyclohexanone | 20 parts |
| Polyisocyanate ("Hardener No. 50 (50% solid content)" by Dainippon Ink & Chemicals, Inc.) | 0.8 parts |

Example 3

By using the following reflective ink 3 as reflective ink, as others are the similar manner in Example 1, and a magnetic card is prepared.

<Reflective Ink 3>

| | |
|---|---|
| Metal flake paste ("METASHEEN 71-0010 (10% solid content)" by Toyo Aluminium K.K.) | 10 parts |
| Vinyl chloride-vinyl acetate copolymer resin (UCC "VMCH (100% solid content)" by UCC, co.) | 2.5 parts |

-continued

| | |
|---|---|
| Polyurethane resin ("NT-810-45 (45% solid content)" by Dainippon Ink & Chemicals, Inc.) | 5.6 parts |
| Methyl ethyl ketone | 25 parts |
| Toluene | 20 parts |
| Cyclohexanone | 20 parts |
| Polyisocyanate ("Hardener No. 50 (50% solid content)" by Dainippon Ink & Chemicals, Inc.) | 1 part |

Comparative Example 1

By using the following reflective ink 4 as reflective ink, as others are the similar manner in Example 1, and a magnetic card is prepared.
<Reflective Ink 4>

| | |
|---|---|
| Metal flake paste ("METASHEEN 71-0010 (10% solid content)" by Toyo Aluminium K.K.) | 10 parts |
| Vinyl chloride-vinyl acetate copolymer resin ("VMCH (100% solid content)" by UCC, co.) | 0.5 part |
| Polyurethane resin ("NT-810-45 (45% solid content)" by Dainippon Ink & Chemicals, Inc.) | 1.1 parts |
| Methyl ethyl ketone | 25 parts |
| Toluene | 20 parts |
| Cyclohexanone | 20 parts |
| Polyisocyanate ("Hardener No. 50 (50% solid content)" by Dainippon Ink & Chemicals, Inc.) | 0.1 part |

Comparative Example 2

By using the following reflective ink 5 as reflective ink, with the same method as in the case of Example 1, and a magnetic card is prepared.
<Reflective Ink 5>

| | |
|---|---|
| Metal flake paste ("METASHEEN 71-0010 (10% solid content)" by Toyo Aluminium K.K.) | 10 parts |
| Vinyl chloride-vinyl acetate copolymer resin ("VMCH (100% solid content)" by UCC, co.) | 1 part |
| Polyurethane resin ("NT-810-45 (45% solid content)" by Dainippon Ink & Chemicals, Inc.) | 2.2 parts |
| Methyl ethyl ketone | 25 parts |
| Toluene | 20 parts |
| Cyclohexanone | 20 parts |
| Polyisocyanate ("Hardener No. 50 (50% solid content)" by Dainippon Ink & Chemicals, Inc.) | 0.2 part |

Comparative Example 3

In the comparative example 2, a coating method of reflective ink is reverse roll coating method by a reverse roll with 225 cm in diameter, the number of rotations is about 114% (peripheral speed 34.2 m/min) to base material running speed to opposite direction of a direction of movement of a base material, line velocity is 30 m/min, and others are in the similar manner to the comparative example 2, and a magnetic card is prepared.

Comparative Example 4

In the Example 1, instead of the reflective ink 1, a coating material for the following concealing layer is applied by a reverse roll coating method, and a silver concealing layer and dried is provided; the others are in the similar manner to Example 1, and a magnetic card is prepared.
<A Coating Material for a Concealing Layer>

| | |
|---|---|
| Aluminium paste ("SAP-210EA (50% solid content)" by SHOWA ALUMINUM POWDER K.K.) | 1 part |
| Vinyl chloride-vinyl acetate copolymer resin ("SOLBIN A (100% solid content)" by Nissin Chemical Co., Ltd.) | 1.5 parts |
| Polyurethane resin "TS-03 (100% solid content)" (by Dainippon Ink & Chemicals, Inc.) | 0.5 part |
| Methyl ethyl ketone | 10 parts |
| Toluene | 10 parts |
| Cyclohexanone | 5 parts |
| Polyisocyanate ("Hardener No. 50 (50% solid content)" by Dainippon Ink & Chemicals, Inc.) | 0.8 part |

Comparative Example 5

In Example 1, an anchor layer which applies a coating material for the following anchor layers with a reverse roll coating method instead of the reflective ink and dried is provided, as others are in the similar manner to Example 1, a magnetic card is prepared.
<A Coating Material for Anchor Layers>

| | |
|---|---|
| Vinyl chloride-vinyl acetate copolymer resin ("SOLBIN A (100% solid content)" by Nissin Chemical Co., Ltd.) | 1.5 parts |
| Polyurethane resin "TS-03 (100% solid content)" (by Dainippon Ink & Chemicals, Inc.) | 0.5 part |
| Methyl ethyl ketone | 10 parts |
| Toluene | 10 parts |
| Cyclohexanone | 5 parts |
| Polyisocyanate ("Hardener No. 50 (50% solid content)" by Dainippon Ink & Chemicals, Inc.) | 0.8 part |

Comparative Example 6

In the comparative example 5, metal of a deposition layer provided in an optical diffraction layer is changed into aluminium (deposition layer thickness of 35 nm), and as others are in the similar manner to Comparative example 4, and a magnetic card is prepared.

About magnetic cards of Example 1-3 and the Comparative example 1-Comparative example 6, which are prepared as mentioned above, by the following test procedures, the evaluation of external appearance of a hologram layer and the evaluation of ESD characteristics are performed.
<Evaluation of External Appearance of a Hologram Layer>

They are judged by visual inspection as using the following valuation basis.
◯ . . . A hologram image which presents bright external appearance of silver gray can be confirmed.
X . . . Quantity of reflected light is a little, and serves as a hologram image with generally dark hue.

Also, as an evaluation of hologram design, measurement of a gloss value of a mirror plane part is carried out by using a gloss meter by BYK-Gardner GmbH "Micro-TRI-gloss."

<Evaluation of ESD Characteristics>

Evaluation of ESD characteristics is carried out by two methods as the follows.

(Esd Characteristics 1)

Figure 3:
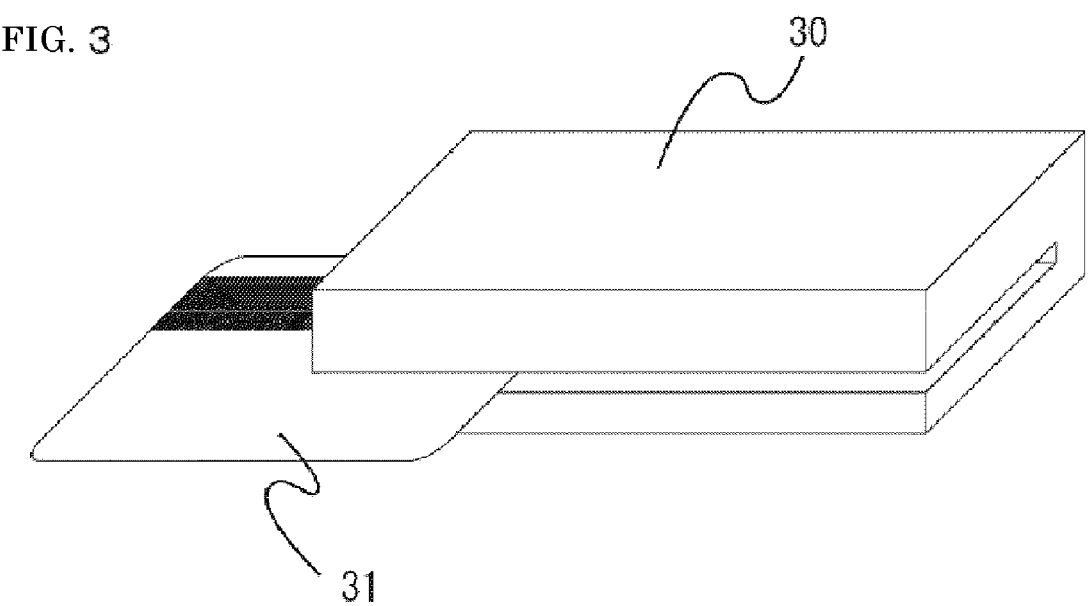
FIG. 3 is a conceptual diagram showing a method for investigating ESD characteristics.
Figure 4:
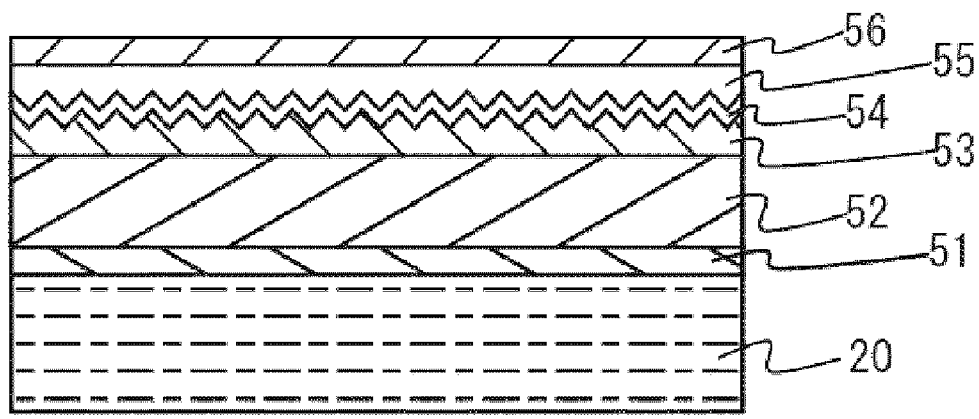
FIG. 4 is a sectional view showing a configuration of a magnetic card with a hologram formerly used.

In a room with constant temperature and humidity, the indoor environment sets in 20 degrees of atmospheric temperature and 15% of relative humidity; as shown in FIG. 3, the hand sweep reader by NCR is used as the magnetic card reader 30. "Card for operation confirming" in which recorded magnetic data for a test is transmitted (swept) through the magnetic card reader. Then, it is confirmed whether the magnetic card reader 30 operates normally (magnetic data can be read normally) or not.

As magnetic recorded data for a test, a write current value set to 280% of reference current values specified in ISO, and written by frequency as 200 fci is used.

Figure 5:
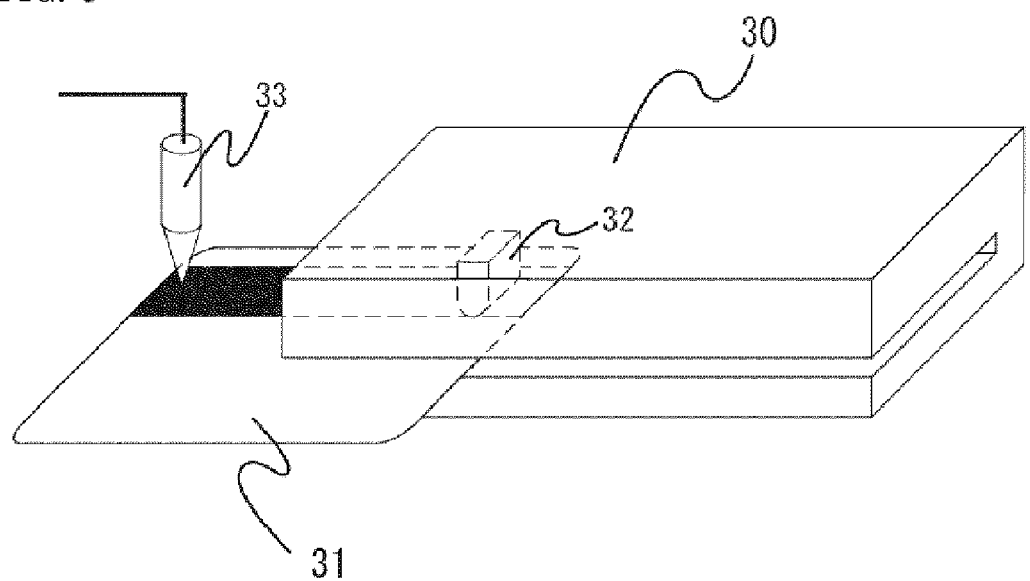
FIG. 5 is a conceptual diagram showing one method of evaluating the ESD characteristics of a card-like magnetic recording medium.

After confirming a normal operation, as shown in FIG. 5, the magnetic card 31 without magnetic recording is inserted to the above-mentioned magnetic card reader, in order that the part of surface about 1-cm apart from an end of the surface of a magnetic stripe contacts the magnetic head 32 of the magnetic card reader 30. To the part of surface of the magnetic stripe about 1-cm apart from the opposite end to the head-contacting side, test voltage is single discharged from discharge terminal by using an electrostatic discharge simulator (as matching IEC61000-4-2 (electrostatic discharge immunity type test) standard), and the voltage induced in a magnetic head of the hand sweep reader in that time is measured.

The discharge is carried out, after a test voltage setup, by putting the discharge terminal close to the magnetic stripe gradually until a dielectric breakdown in the air occurred.

Hence, when a electric conduction route with small specific resistance is formed in the direction of a magnetic stripe, since discharging current flows into the route and discharge is occurred with the head, the strength of the discharge is measured as an output of induced voltage which is proportioned to the strength of discharge.

After discharge of test voltage, the magnetic card 31 of the magnetic card reader 30 under test is removed, a card for operation confirming is transmitted (swept), the magnetic card reader 30 is operated, and existence of an operation abnormality of a magnetic card reader induced by the discharge is measured. Hence, it is examined by the magnetic card reader 30, whether magnetic data for a test recorded on a card for operation confirming can be read or not.

When the magnetic data for a test cannot be read, and reset of the apparatus is required, it is considered as malfunction.

The test is performed at test voltage of 2 kV, 4 kV, 8 kV, and 15 kV.

(ESD Characteristics 2)

In a room with constant temperature and humidity, the indoor environment sets in 20 degrees of atmospheric temperature and 15% relative humidity, and a test card in which magnetic data is not recorded is transmitted (swept) through the NCR hand sweep reader at 1 time a second.

At that time, a magnetic stripe part of the test card is charged by rubbing with the hand sweep reader, the discharge to the magnetic recording head can be observed.

Discharge voltage after sweeping continuously about 100 times is measured.

After measurement, in order to confirm existence of an operation abnormality of the magnetic card reader 30, the card for operation confirming in which magnetic data for the test is recorded is transmitted (swept), and it is examined whether magnetic data for a test can be read or not.

When the magnetic data for a test cannot be read, and reset of the apparatus is required, it is considered as malfunction.

TABLE 1

|   | Pigment | Mass ratio of (Binder resin/ Metal flake) | Coating method | Deposited layer | External appearance of hologram layer | Gloss value (20 degree) |
| --- | --- | --- | --- | --- | --- | --- |
| Example 1 | Metal flake | 3.0 | Micro-gravure coating | Titanium oxide | ◯ | 560 |
| Example 2 | Metal flake | 4.0 | Micro-gravure coating | Titanium oxide | ◯ | 510 |
| Example 3 | Metal flake | 5.0 | Micro-gravure coating | Titanium oxide | ◯ | 440 |
| Comparative example 1 | Metal flake | 1.0 | Micro-gravure coating | Titanium oxide | ◯ | 710 |
| Comparative example 2 | Metal flake | 2.0 | Micro-gravure coating | Titanium oxide | ◯ | 650 |
| Comparative example 3 | Metal flake | 2.0 | Reverse roll coating | Titanium oxide | ◯ | 520 |
| Comparative example 4 | Aluminium powder | 2.0 | Reverse roll coating | Titanium oxide | X | 80 |
| Comparative example 5 | — | — | Reverse roll coating | Titanium oxide | X | 190 |
| Comparative example 6 | — | — | Reverse roll coating | Aluminium | ◯ | 1000 |

Table 1 is a table which summarized external appearance of a hologram layer about each magnetic card of the example 1-example 3 and the comparative example 1-comparative example 6.

As shown in Table 1, a bright hologram can confirm clearly and external appearance are "◯" (good) in the magnetic card of the example 1-example 3, the comparative example 1-comparative example 3, and the comparative example 6; In contrast with, the comparative example 4 has low reflection from a concealing layer, and it becomes a hologram of a dark color tone; the comparative example 5 can be recognized the magnetic recording layer of a dark color tone through the hologram; and the external appearance of the both magnetic cards is "X" (bad).

As a result of measuring a gloss value of a hologram mirror surface part, the comparative example 4 and the comparative example 5 shows the extreme low value as compared with others and these result has good coincidence with the results of visual evaluation.

The comparative example 2 and the comparative example 3 change only the coating method by using the same reflective ink.

With this, the comparative example 2 which provides a reflective ink layer by micro-gravure coating shows 100 or more higher gloss value as compared with the comparative example 3 which provides the reflective ink layer by reverse roll coating.

Because the composition of these reflective ink layers is completely the same, when micro-gravure coating is used as the technique of providing the reflective ink layer, it is shown that the high gloss value can be acquired.

TABLE 2

|  | 2 kV test | | 4 kV test | | 8 kV test | | 15 kV test | |
| --- | --- | --- | --- | --- | --- | --- | --- | --- |
|  | ESD Voltage | Existence of malfunctions | ESD Voltage | Existence of malfunctions | ESD Voltage | Existence of malfunctions | ESD Voltage | Existence of malfunctions |
| Example 1 | 0 | no | 0 | no | 0 | no | 22 | no |
| Example 2 | 0 | no | 0 | no | 0 | no | 15 | no |
| Example 3 | 0 | no | 0 | no | 0 | no | 3 | no |
| Comparative example 1 | 0 | no | 6 | no | 20 | no | 55 | yes |
| Comparative example 2 | 0 | no | 4 | no | 16 | no | 29 | yes |
| Comparative example 3 | 0 | no | 5 | no | 14 | no | 29 | yes |
| Comparative example 4 | 0 | no | 0 | no | 0 | no | 0 | no |
| Comparative example 5 | 0 | no | 0 | no | 0 | no | 0 | no |
| Comparative example 6 | >150 | yes | >150 | yes | >150 | yes | >150 | yes |

In the above-mentioned table,

ESD voltage: Voltage value (V) observed for magnetic head at the time of discharge, Existence of malfunctions: In case that magnetic data for a test is unreadable and reset of an apparatus is required, it is considered to be malfunction.

Table 2 is a table which summarizes the evaluation result about the ESD characteristics 1 about each magnetic card of Example 1-3 and the comparative example 1-comparative example 6.

In the example 1-example 3, the comparative example 4, and the comparative example 5, in all the evaluations, abnormalities which require reset of the apparatus after the test are not occurred.

Especially about the test which discharge voltage is 2 kV-8 kV, induced voltage is not observed at all in magnetic head and good ESD characteristics are shown.

On the other hand, the magnetic cards of the comparative example 1, the comparative example 2, and the comparative example 3, in which the ratio of binder resin/metal flake for the reflective ink layer is smaller than 3, and the magnetic card of the comparative example 6, which uses an aluminum-vapor-deposition layer in place of the transparent non-conductive deposited layer, since a electric conduction route of small specific resistance is formed in the direction of a magnetic stripe, the occurrence of discharge to the magnetic heads causes to malfunctions of the magnetic card reader, depending on discharge voltage of a discharge simulator.

TABLE 3

|  | ESD Voltage | Existence of malfunctions |
| --- | --- | --- |
| Example 1 | 13-20 | no |
| Example 2 | 10-15 | no |
| Example 3 | 5-10 | no |
| Comparative example 1 | 40-60 | yes |
| Comparative example 2 | 25-35 | yes |
| Comparative example 3 | 20-28 | yes |
| Comparative example 4 | 0 | no |
| Comparative example 5 | 0 | no |
| Comparative example 6 | 280-410 | yes |

In the above-mentioned table,

ESD voltage: Induced voltage value (V) observed by magnetic head at the time of discharge, Existence of malfunctions: In case that magnetic data for a test is unreadable and reset of an apparatus is required, it is considered to be malfunction.

Table 3 is a table which summarizes the evaluation result for the ESD characteristics 2 about each magnetic card of Example 1-3 and the comparative example 1-comparative example 6.

In the example 1-example 3, the comparative example 4, and the comparative example 5, after the test, abnormalities which require reset of the apparatus are not occurred.

However, on the other hand, in a magnetic card of the comparative example 1, the comparative example 2, and the comparative example 3, in which the binder resin/metal flake of a reflective ink layer are smaller than 3, and in the magnetic card of the comparative example 6, which uses an aluminum-vapor-deposition layer in place of the transparent non-conductive deposited layer, discharge occurs between the magnetic stripe and the magnetic head of the magnetic card reader, caused from electrified charge, and malfunctions of the magnetic card reader occur.

As above-mentioned results shown in table 1-table 3, either one of characteristics, external appearance of a hologram layer or ESD characteristics, is declined in the magnetic card of the comparative example 1-comparative example 6; however, a good result in both characteristics is obtained in the magnetic card of the example 1-example 3.

Hence, in the magnetic card of the example 1-example 3, since the reflective ink layer 13 is provided between the magnetic recording layer 12 and the transparent non-conductive deposited layer 14, and a mass ratio of binder resin to metal flake in the reflective ink layer is set up appropriately; thus, a reflectance in the reflective ink layer 13 is maintained, and a pattern of a hologram layer comprised by the transparent non-conductive deposited layer 14 and the transparent optical diffraction layer 15 is to be recognized visually and distinctly; and simultaneously, since it prevent for metal flake approaching together more than needed, and prevent for electric conduction route with small specific resistance forming, high ESD characteristics can be achieved.

As mentioned above, although an embodiment of this invention has been explained in full detail with reference to drawings, a concrete composition is not restricted to these embodiments, and the range of designs, embodiment, etc., which does not deviate from the abstract of this invention are included.

[Industrial Applicability]

A magnetic recording medium, which a hologram pattern is able to be visually recognized distinctly and has good ESD characteristics, simultaneously, can be formed.

EXPLANATIONS OF LETTERS OR NUMERALS

10 . . . Transferable laminate
11 . . . Adhesive layer
12 . . . Magnetic recording layer
13 . . . Reflective ink layer
14 . . . Transparent non-conductive deposited layer
15 . . . Transparent optical diffraction layer 16 . . . Protective layer
20 . . . Base material of a card
21 . . . Temporary support
30 . . . Magnetic card reader
31 . . . Magnetic card
32 . . . Magnetic head
33 . . . Discharge terminal
51 . . . Adhesive layer
52 . . . Magnetic recording layer
53 . . . Anchor layer
54 . . . Metal deposited layer
55 . . . Transparent optical diffraction layer
56 . . . Protective layer

What is claimed is:

1. A magnetic recording medium, comprising:
a base material;
a magnetic recording layer provided above the base material;
a reflective ink layer provided above the magnetic recording layer, the reflective ink layer comprising a metal flake and a binder resin, wherein a mass ratio of the binder resin to the metal flake in the reflective ink layer is 3.0:1-10.0:1; and
a transparent non-conductive deposited layer provided above the reflective ink layer.

2. The magnetic recording medium according to claim 1, wherein the magnetic recording layer is formed in a longitudinal direction of the base material having a stripe shape, and
wherein the reflective ink layer is formed on all area adjoining to the magnetic recording layer.

3. The magnetic recording medium according to claim 1 or 2, wherein the reflective ink layer is formed by applying reflective ink containing the metal flake and the binder resin by micro-gravure coating.

4. A method for manufacturing of a transferable laminate, comprising:
providing a temporary support, and
laminating a transparent optical diffraction layer, a transparent non-conductive deposited layer, a reflective ink layer, a magnetic recording layer, an adhesive layer as required, in this order on the temporary support;
wherein the reflective ink layer is formed by coating the transparent non-conductive deposited layer with a reflective ink containing a metal flake and a binder resin,
wherein a mass ratio of the binder resin to the metal flake in the reflective ink is 3.0:1-10.0:1.

5. The method for manufacturing of a transferable laminate according to claim 4 comprising:
having a transfer process which laminates, from a side close to a base material, the magnetic recording layer, the reflective ink layer, the transparent non-conductive deposited layer, and the transparent optical diffraction layer, in this order on a base material via the adhesive layer.

6. A transferable laminate, comprising:
a temporary support;
a transparent optical diffraction layer provided above the temporary support;
a transparent non-conductive deposited layer provided above the transparent optical diffraction layer;
a reflective ink layer provided above the transparent non-conductive deposited layer; and
a magnetic recording layer provided above the reflective ink layer,
wherein the reflective ink layer comprises a metal flake and a binder resin,
wherein a mass ratio of the binder resin to the metal flake in the reflective ink layer is 3.0:1-10.0:1.

* * * * *